United States Patent
Aimone et al.

(10) Patent No.: US 12,510,794 B2
(45) Date of Patent: Dec. 30, 2025

(54) DIFFERENTIAL OPTICAL WAVEGUIDE MODULATOR

(71) Applicant: Nokia Solutions and Networks Oy, Espoo (FI)

(72) Inventors: Alessandro Aimone, Berlin (DE); Philipp Thomas, Garwood, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 286 days.

(21) Appl. No.: 18/195,128

(22) Filed: May 9, 2023

(65) Prior Publication Data

US 2024/0377695 A1 Nov. 14, 2024

(51) Int. Cl.
| | |
|---|---|
| *G02F 1/035* | (2006.01) |
| *G02F 1/025* | (2006.01) |
| *G02F 1/21* | (2006.01) |
| *G02F 1/225* | (2006.01) |

(52) U.S. Cl.
CPC .............. *G02F 1/212* (2021.01); *G02F 1/025* (2013.01); *G02F 1/0356* (2013.01); *G02F 1/225* (2013.01); *G02F 1/2255* (2013.01); *G02F 2201/126* (2013.01)

(58) Field of Classification Search
CPC .......................... G02F 1/2255; G02F 2201/127
USPC ........................................................ 385/1–3
See application file for complete search history.

(56) References Cited

U.S. PATENT DOCUMENTS

| | | | |
|---|---|---|---|
| 6,522,793 B1 * | 2/2003 | Szilagyi | G02F 1/225 |
| | | | 385/2 |
| 6,567,203 B1 * | 5/2003 | Hill | G02F 1/2255 |
| | | | 359/254 |
| 10,048,519 B1 | 8/2018 | El-Moznine et al. | |
| 2004/0240888 A1 | 12/2004 | Leuthold et al. | |
| 2019/0324345 A1 | 10/2019 | Vera Villarroel et al. | |
| 2021/0285819 A1 | 9/2021 | Poli et al. | |
| 2022/0021461 A1 | 1/2022 | Yang et al. | |
| 2022/0197104 A1 * | 6/2022 | Miyazaki | G02F 1/035 |
| 2022/0404680 A1 | 12/2022 | Jacques et al. | |

FOREIGN PATENT DOCUMENTS

JP 2018180255 11/2018

OTHER PUBLICATIONS

Honggang et al., High-Order Electrical Spectrum Method for Measuring the Chirp of a Silicon Mach-Zehnder Modulator, Journal of Lightwave Technology, vol. 38, No. 24, Dec. 15, 2020.
(Continued)

*Primary Examiner* — Robert Tavlykaev
(74) *Attorney, Agent, or Firm* — Stratford Group Ltd.

(57) ABSTRACT

A planar electro-optic Mach-Zehnder modulator (MZM) includes two optical waveguide arms and three drive electrodes extending along the optical waveguide arms to modulate light propagating therein. A middle one of the drive electrodes is between the two optical waveguide arms, and the two optical waveguide arms are between outer ones of the drive electrodes. An electrical drive circuit is connected to provide first modulation signals to the two outer ones of the drive electrodes and a second modulation signal to the middle one of the drive electrodes, wherein the second modulation signal is voltage-inverted relative to the first modulation signals.

10 Claims, 10 Drawing Sheets

(56) References Cited

OTHER PUBLICATIONS

Xuecheng Liu et al, Wideband thin-film lithium niobate modulator with low half-wave-voltage length product, Chinese Optics Letters, vol. 19, Issue 6, p. 060016, (2021).

Mingbo He et al, High-Performance Hybrid Silicon and Lithium Niobate Mach-Zehnder Modulators for 100 Gbit/s and Beyond, Asia Communications and Photonics Conference (ACPC) 2019, OSA Technical Digest (Optica Publishing Group, 2019), paper T4H.3.

* cited by examiner

DIFFERENTIAL OPTICAL WAVEGUIDE MODULATOR

TECHNICAL FIELD

The present invention relates to integrated electro-optical modulators and drivers thereof.

BACKGROUND

Data center interconnects and broad-band telecom networks make use of optical communication modules to process the high data rates of internet traffic. Optical transceiver (TRx) capable of high data rates typically use Mach-Zehnder modulators (MZMs) having RF-driven electro-optical phase modulators in each waveguide arm. A thin-film LN (TFLN) modulator combining superior electro-optic properties of LN with silicon photonics (SiP) may be implemented in an opto-electronic chip as a photonic integrated circuit (PIC). Advantageously, SiP can utilize mature CMOS processes to fabricate highly integrated optical circuits on a silicon substrate, allowing SiP chips to be mass produced at relatively low cost. Using thin-film optical materials having a large Pockels effect, such as e.g., thin-film lithium niobate (LiNbO3, "LN"), in the waveguide arms of an MZM enables providing data rates in excess of 100 Giga-bit/second (Gbs) while controlling for power consumption. The physical size of thin-film LiNbO3 modulators, which may be up to several centimeters long, can limit how compact an optical transceiver can be.

SUMMARY

Embodiments described herein relate to differentially-driven MZMs utilizing an electro-optic material in waveguide arms thereof.

According to an example embodiment, provided is an apparatus comprising a planar electro-optic Mach-Zehnder modulator (MZM) disposed along a main surface of a substrate, and an electrical drive circuit. The planar electro-optic MZM comprises two optical waveguide arms extending along the main surface and optically connected to receive light in parallel from an optical splitter, and three drive electrodes extending along the optical waveguide arms to modulate light propagating therein, a middle one of the drive electrodes being between the two optical waveguide arms, the two optical waveguide arms being between the two outer ones of the drive electrodes. The electrical drive circuit is connected to provide first modulation signals to the two outer ones of the drive electrodes and a second modulation signal to the middle one of the drive electrodes, wherein the second modulation signal is voltage-inverted relative to the first modulation signals.

According to a related example embodiment, provided is a method comprising: applying first radio-frequency (RF) electrical drive signals to two outer drive electrodes of a planar electro-optic MZM, and applying a second RF electrical drive signal to a middle drive electrode of the planar electro-optic MZM, the second RF electrical drive signal being voltage-inverted relative to the first RF electrical drive signals. The middle drive electrode is between two optical waveguide arms of the planar electro-optic Mach-Zehnder modulator and the two optical waveguide arms are between and along the outer drive electrodes.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION OF SOME SPECIFIC EMBODIMENTS

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:

"CMOS" Complementary Metal-Oxide-Semiconductor
"Si" Silicon
"LN" Lithium Niobate
"PIC" Photonic Integrated Circuit
"SOI" Silicon on Insulator
"SiP" Silicon Photonics "IC" Integrated Circuit
"MZM" Mach-Zehnder Modulator
"RF" Radio Frequency
"DC" Direct Current
"AC" Alternate Current
"TW" Travelling Wave Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated.

The term "differential signal" refers to a signal that is transmitted using two single-ended signals having about complementary AC components.

Figure 2:
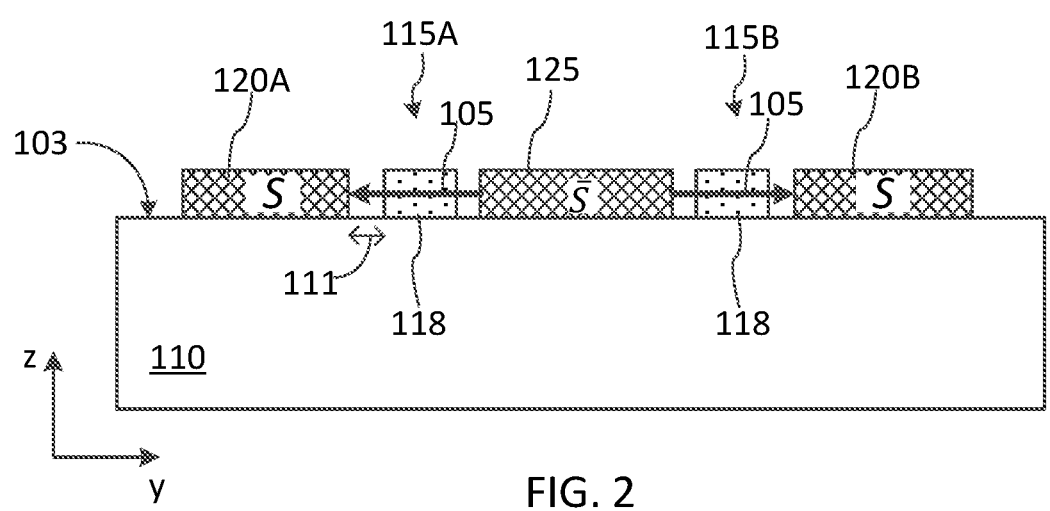
FIG. 2 is a schematic cross-sectional view of a three-electrode optical waveguide MZM showing electrical field direction for push-pull modulation with a differential modulation signal according to an embodiment, e.g., for use as the MZM in any of below FIGS. 3-7.

The present disclosure describes examples of optical waveguide modulators incorporating MZMs that have electro-optic materials in the optical cores of the waveguide arms thereof. At least some of the examples employ a driving scheme in which both optical waveguide arms of the MZM are push-pull modulated using differential signals applied to three drive electrodes disposed alongside the waveguide arms, e.g., as illustrated in FIG. 2.

Figure 1A:
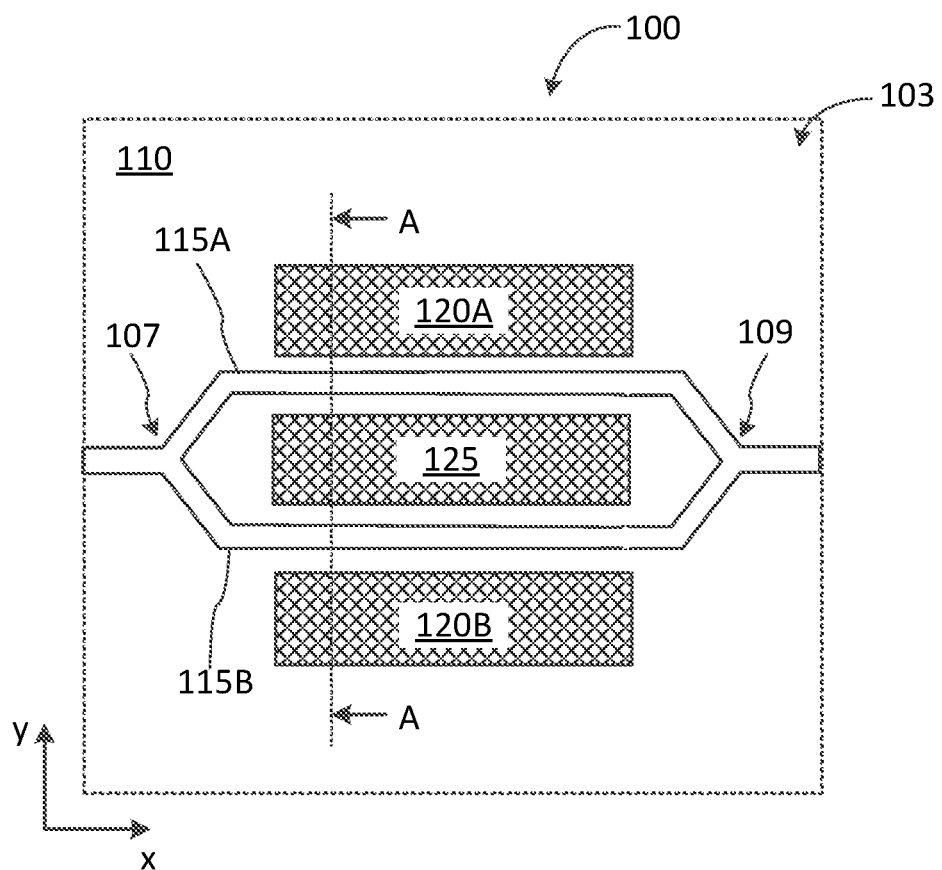
FIG. 1A is a top view of a three-electrode optical waveguide Mach-Zehnder modulator (MZM)

FIG. 1A schematically illustrates a layout of a planar electro-optic MZM 100 located along a main surface 103 of a substrate 110. The electro-optic MZM 100 includes two optical waveguide arms 115A and 115B, which may be commonly referred to as the modulator arms 115. Each of the modulator arms 115 has an optical waveguide core 118 including an electro-optical material, i.e., a material which optical properties, e.g., the refractive index, may be varied by an electrical field, e.g., due to the Pockels effect. In the example embodiments described below the electro-optical material is lithium niobate (LiNbO3, "LN"), but other suitable electro-optical materials may also be used. The modulator arms 115 are connected to receive light in parallel from an optical splitter 107 and to transmit said light to an optical combiner 109, for recombination, after travelling along the modulator arms 115. In some embodiments, the optical splitter 107 and the optical combiner 109 may be formed with a different material than the modulator arms 115; e.g., the optical splitter 107 and the optical combiner 109 may be formed with silicon waveguides, while the modulator arms 115 may be LN waveguides. In some embodiments, the optical splitter 107 and the optical combiner 109 may be located in a different layer than the modulator arms 115, and may be optically coupled to the modulator arms 115 with vertical couplers. The electro-optic MZM 100 also includes a middle electrode 125 extending between the modulator arms 115, and two outer electrodes 120A and 120B ("outer electrodes 120") extending alongside the modulator arms 115A and 115B, respectively ("modulator arms 115"), at the outer sides of the respective modulator arms 115. In this layout, each of the modulator arms 115 are located between the middle electrode 125 and one of the outer electrodes 120. The electrodes 120, 125 are configured to modulate light in each of the two optical waveguide arms 115 responsive to a voltage applied between the middle drive electrode 125 and a respective one of the two outer drive electrodes 120. In a typical embodiment, the electrodes 120, 125 are TW electrodes ("RF waveguides").

Figure 1B:
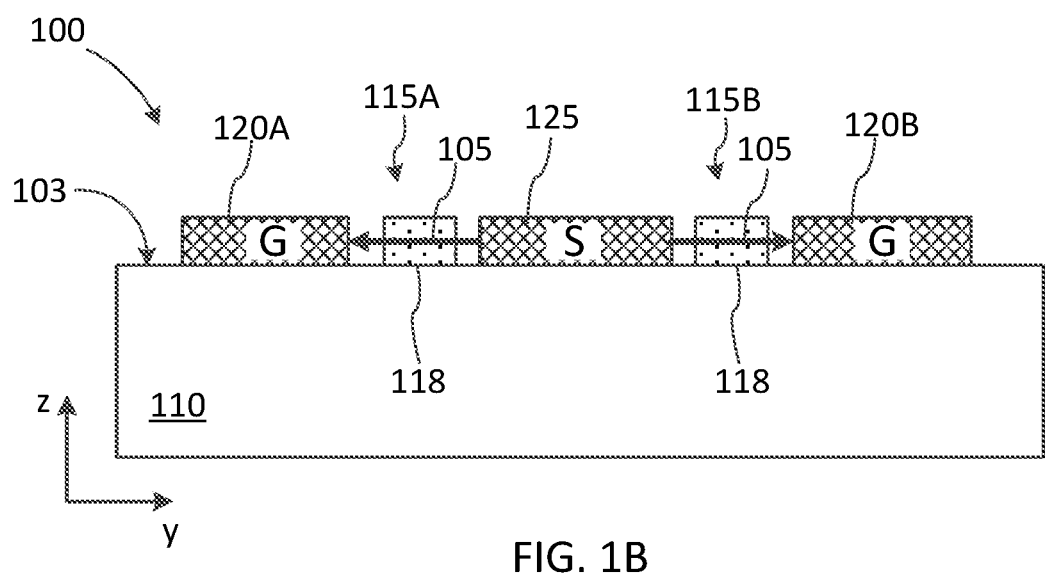
FIG. 1B is a schematic vertical cross-sectional view of the three-electrode optical waveguide MZM showing electrical field directions for conventional push-pull modulation by a single-ended modulating signal.

FIG. 1B schematically illustrates a cross-section of a MZM in which a ground-signal-ground (GSG) electrode configuration. The planar optical waveguides forming the modulator arms 115 have optical cores 118 that are over a main surface 103 of the substrate 110 approximately in-plane with the electrodes 120, 125. The optical cores 118 include EO material, e.g., the LN, the outer electrodes 120 are operated as ground electrodes, i.e., are connected to electrical ground and remain at an approximately constant ground voltage during modulation. The middle electrode 125 is a signal electrode ("drive electrode") driven with a single-ended modulation signal "S", e.g., typically an AC voltage signal oscillating up and down relative to the ground voltage. In this driving scheme, the electrical fields E 105 in the optical cores 118 of the two modulator arms 115A, 115B have opposite directions, resulting in a push-pull modulation of the MZM 100, in which the optical phase of light propagating in the modulator arms 115 is modulated in counter-phase. Advantageously, the push-pull modulation may approximately double the modulation depth of light at the output of the combiner 109 compared to modulating only one of the waveguide arms with a same voltage swing between the middle electrode 125 and one of the outer electrodes 120.

Requirements to the peak-to-peak radio-frequency voltage applied to the middle electrode 125 may be further reduced using a differential driving scheme, e.g., by driving the outer electrodes 120 and the middle electrode 125 with complementary signals. Indeed, by modulating voltages at the outer electrodes 120 be inverted in sign with respect to the modulation voltage at the same longitudinal position along the middle electrode 125. For this reason, the same electrical field 105 in the waveguide arm 115A may be achieved with half of the (per-electrode) peak-to-peak voltage swing.

FIG. 2 illustrates a differential driving scheme for the MZM 100 according to an embodiment of the present disclosure. In this modulation scheme, one or more first RF modulation signals, denoted "S", are applied to the two outer drive electrodes 120A and 120B, and at least one second RF modulation signal, denoted "$\bar{S}$", is applied to the middle drive electrode 125, with the at least one second RF modulation signal being voltage-inverted relative to the first RF modulation signals. In the embodiment of FIG. 2, the two outer electrodes 120A, 120B receive instances of a same first single-ended drive signal S, and the middle electrode 125 receives the second single-ended drive signal $\bar{S}$, wherein alternating current (AC) components the first single-ended drive signal S and the second single-ended drive signal $\bar{S}$ are relatively voltage-inverted at corresponding longitudinal positions along the optical waveguide arms 115A, 115B thereby forming a differential RF drive signal. Advantageously, this modulation scheme results in oppositely-directed electrical fields 105 in the optical cores 118 of the waveguide arms 115, and thus provides the desired push-pull modulation of the optical phase of light propagating in the waveguide arms 115.

Figure 3:
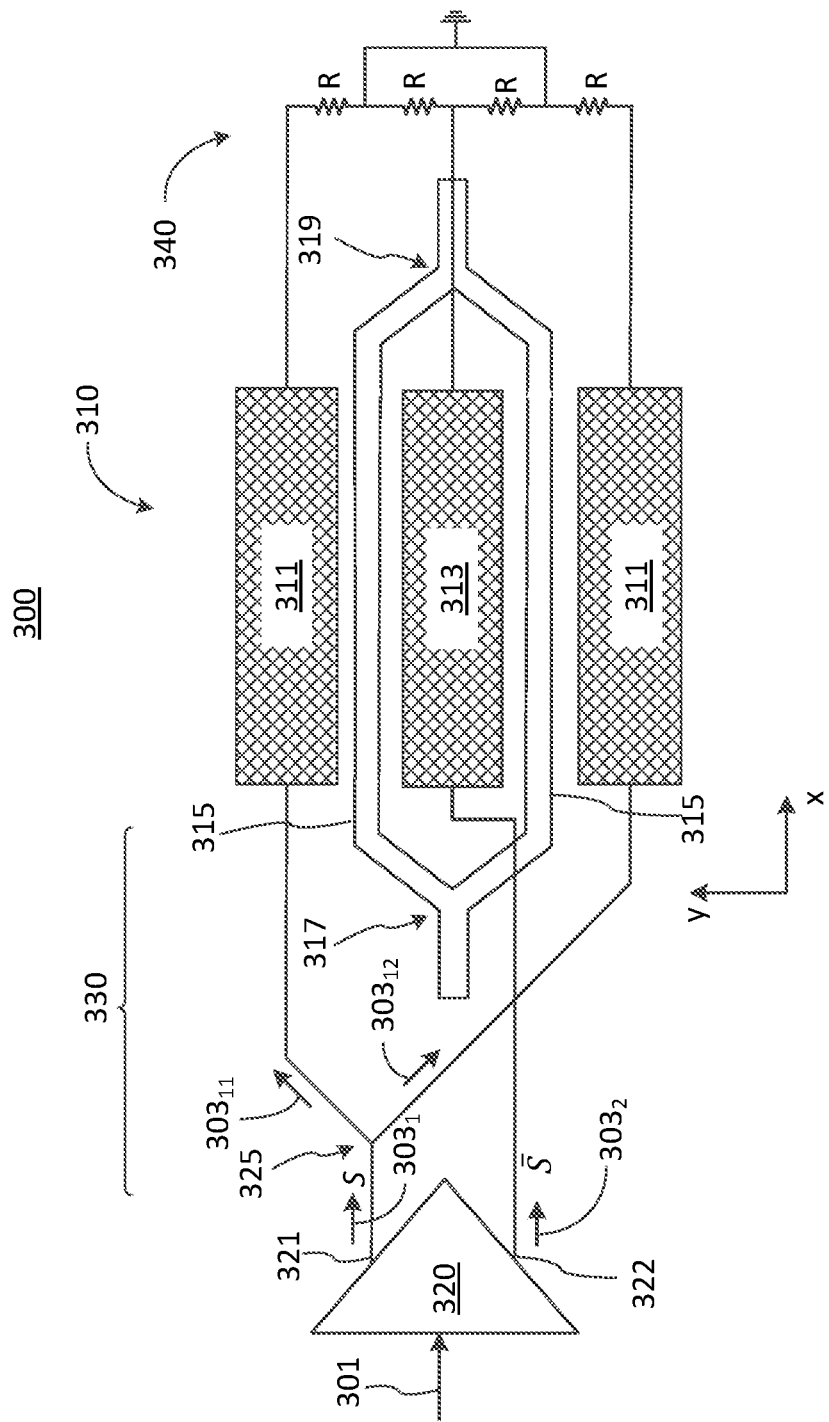
FIG. 3 is a schematic diagram illustrating a driving scheme for push-pull modulation of a three-electrode MZM according to a first embodiment.

FIG. 3 schematically illustrates an apparatus 300 for modulating light according to a first example. The apparatus 300 includes a planar optical waveguide MZM 310 ("MZM 310") and an electrical drive circuit 330. The MZM 310, which may be an embodiment of the MZM 100 described above, includes two optical waveguide arms 315 ("modulator arms 315") and three drive electrodes, i.e., a middle drive electrode 313 and two outer drive electrodes 311. Each of the modulator's optical waveguide arms 315 typically has a planar optical core, that includes an electro-optical material, e.g., lithium niobate, in at least a part of the cross section of the optical core, but other suitable electro-optical materials may also be used. The modulator's optical waveguide arms 315 are connected to receive light in parallel from an optical splitter 317 and to transmit said light to an optical combiner 319, for recombination, after travelling along the modulator arms 315. The optical waveguide arms 315 may be embodiments of the optical waveguide arms 115 of FIG. 2, the middle drive electrode 313 may be an embodiment of the middle drive waveguide 125 of FIG. 2, and the two outer drive electrodes 311 may be embodiments of the outer drive electrodes 120A, 120B of FIG. 2.

The middle drive electrode 313 extends along and is located between the optical waveguide arms 315, with the two outer drive electrodes 311 extending along the outer sides of the respective optical waveguide arms 315A and 315B, so that each of the optical waveguide arms 315 is disposed between the middle drive electrode 313 and one of the outer drive electrodes 311. The drive electrodes 311, 313 are electrically coupled to the electrical drive circuit 330 at one end and to a termination circuit 304 at the other end. The drive electrodes 311, 313 are configured to modulate light in each of the two optical waveguide arms 315 responsive to modulating voltages applied between the middle drive electrode 313 and a respective one of the two outer drive electrodes 311.

The electrical drive circuit 330 is configured to electrically couple one or more differential drive signals sourced from a differential driver 320 to the three drive electrodes 311, 313 of the MZM 310. In the illustrated example, the electrical drive circuit 330 synchronously drives the outer drive electrodes 311 with first single-ended driving signals $303_{11}$, $303_{12}$ that vary substantially in-phase with each other, and drives the middle drive electrode 313 with a second single-ended driving signal $303_2$. The second single-ended driving signal $303_2$ is voltage-inverted relative to the first single-ended driving signals $303_{11}$, $303_{12}$ at corresponding longitudinal positions along the optical waveguide arms 315.

The differential driver 320 is configured to generate a differential drive signal (S, $\overline{S}$), e.g., responsive to receiving a data-carrying signal 301. The differential driver 320 has two differential output ports 321 and 322 configured to output respective single-ended components, S $303_1$ and $\overline{S}303_2$, of the differential drive signal (S, $\overline{S}$). The electrical drive circuit 330 is configured to couple a first of the two differential output ports, i.e., port 321, to each of the two outer drive electrodes 311, and to electrically couple the second of the two differential output ports, i.e., port 322, to the middle drive electrode 313. In the illustrated embodiment, the electrical drive circuit 330 includes an RF signal splitter 325 connected to split the first single ended component S 3011 of the differential drive signal (S, $\overline{S}$) to obtain the two approximately synchronous modulation driving signals $303_{11}$ and $303_{12}$ to drive the respective outer electrodes 311 therewith. The RF signal splitter 325 may also be referred to herein as the first signal splitter. In some embodiments, the middle drive electrode 313 may be wider than the outer drive electrodes 311, e.g., approximately twice wider than each of the outer drive electrodes 311.

Figure 4:
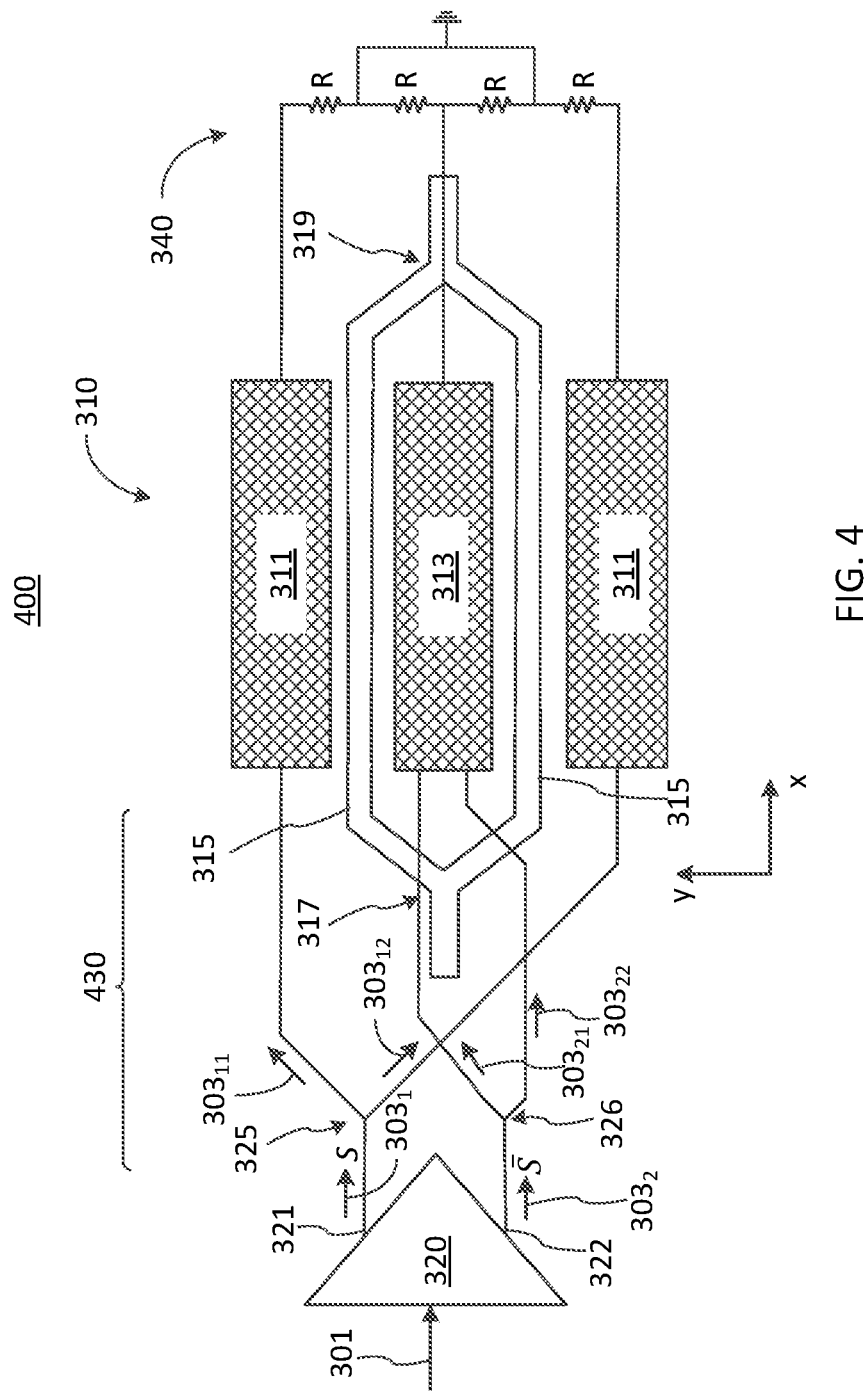
FIG. 4 is a schematic diagram illustrating a driving scheme for push-pull modulation of a three-electrode MZM according to a second embodiment.

FIG. 4 schematically illustrates an apparatus 400 for modulating light according to a second example. The apparatus 400 is a modification of the apparatus 300 and differs therefrom by the presence of a second RF splitter 326; elements of the apparatus 400 having same functions as corresponding elements of the apparatus 300 are indicated with the same reference numerals and are not described here again. The second RF splitter 326 is disposed to split the second, inverted single-ended component $303_2$ of the differential drive signal 303 into two approximately synchronous modulation driving signals $303_{21}$ and $303_{22}$, which are than provided to the middle drive electrode 313 along separate signal paths. The splitting of the second, inverted single-ended component $303_2$ between two different paths may facilitate matching parasitic capacitances and inductances of the signal paths between the driver 320 and the drive electrodes 311, 313 and proper balancing of the different drive signals provided to the outer and middle drive electrodes 311, 313 of the MZM 310.

Figure 5:
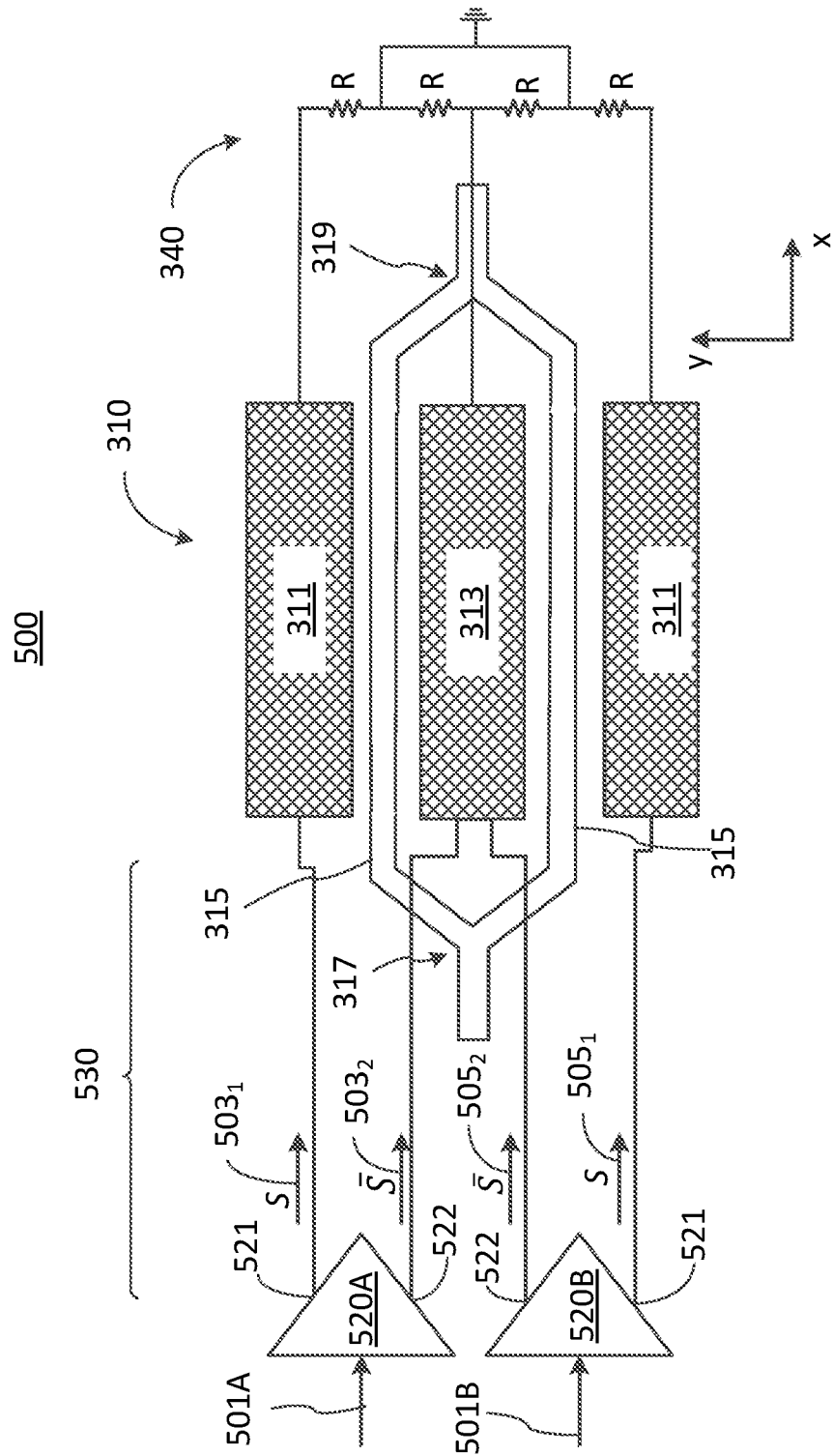
FIG. 5 is a schematic diagram illustrating a driving scheme for push-pull modulation of a three-electrode MZM using two parallel differential drivers according to a third embodiment.

FIG. 5 schematically illustrates an apparatus 500 for modulating light according to a third example. The apparatus 500 is a modification of the apparatus 400 that employs two parallel differential drivers 520A and 520B to drive the three drive electrodes 311 and 313; elements of the apparatus 400 having same functions as corresponding elements of the apparatus 300 or apparatus 400 are indicated with the same reference numerals and will not be described here again. The two parallel differential drivers 520A and 520B generate approximately synchronous differential signals 505 and 505, e.g., in response to receiving signals 501A and 501B representing a same data signal. Each of the differential drivers 520A, 520B has two differential output ports 521 and 522. The differential drivers 520A and 520B are configured to output approximately mutually synchronous, i.e., varying in-phase with each other, first single-ended signals $503_1$ and $505_1$ from the respective first output ports 521 of the differential drivers 520A and 520B, and to output second single-ended signals $503_2$ and $505_2$ from the respective second output ports 522 of the differential drivers 520A and 520B. The second single-ended signals $503_2$ and $505_2$ are also approximately mutually synchronous, i.e., in-phase with respect to each other, but are voltage-inverted relative to the first single-ended signals $503_1$ and $505_1$.

In some embodiments, the first output ports 521 may be non-inverting output ports of the differential drivers 530A and 530B, with the second output ports 522 being the inverting output ports of the differential drivers 530A or 530B. In other embodiments, the first output ports 521 may be inverting output ports of the differential drivers 530A and 530B, with the second output ports 522 being the non-inverting output ports of the differential drivers 530A or 530B. In some embodiments, the differential drivers 530A or 530B may receive mutually inverted inputs 501A, 501B, in which case the inverted and non-inverted outputs of one of the differential drivers 520A and 520B may be flipped.

A drive circuit 530 connects the output ports 521 and 522 of the differential drivers 520A, 520B to the three drive electrodes 311, 313 so as to drive the middle drive electrode 313 with a signal whose AC component is voltage-inverted in sign with respect to the signals driving the outer drive electrodes 311. In the illustrated embodiment, the drive circuit 530 connects the first output ports 521 of the differential drivers 520A, 520B to corresponding ones of the two outer drive electrodes 311 of the MZM 310, and connects the second output ports 522 of the differential drivers 520A, 520B to the middle drive electrode 313 of the MZM 310.

In various embodiments of the apparatus 300, apparatus 400, or apparatus 500, the MZM 310 may be implemented in a same chip with the respective differential drivers or, typically, in a different chip, e.g., a SiP chip with a thin-film LN material bonded thereto. In some embodiments, the respective electrical drive circuits 330, 430, or 530 may be implemented at least in part in the same chip with the MZM 310; e.g., in some embodiments, the RF signal splitter 325 and, when present, the RF signal splitter 326 may be integrated, i.e., implemented in a same chip, with the MZM 310. In some embodiments, the respective electrical drive circuits 330, 430, or 530 may be implemented at least in part separately from the photonic chip carrying the MZM 310.

Having the electrical driver circuits 330, 430, or 530 implemented separately from the photonic chip of the MZM 310 may allow applying the SSS driving scheme of the present disclosure to an MZM that is configured for the conventional GSG driving scheme, as illustrated in FIG. 1B.

Figure 6:
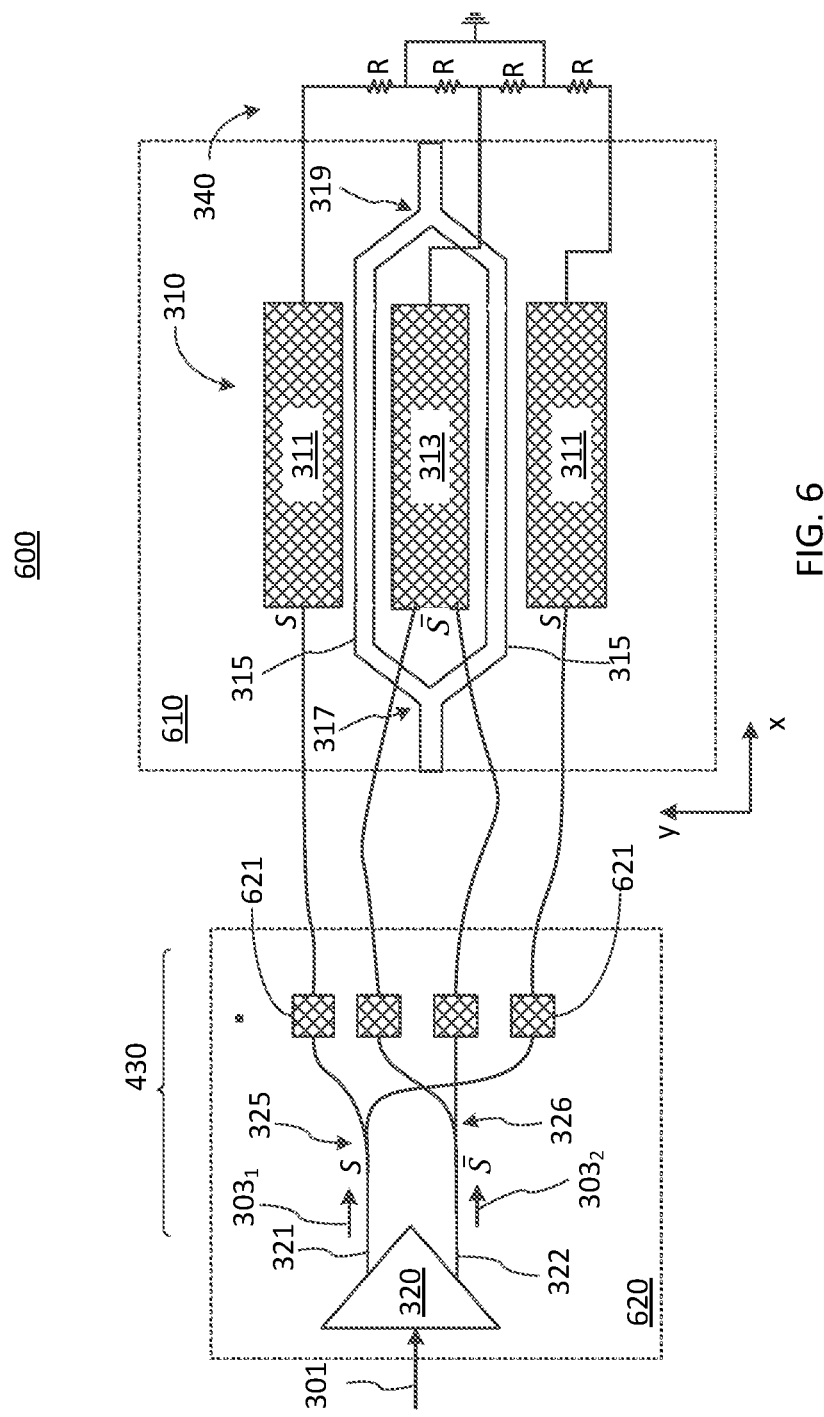
FIG. 6 is a schematic plan view of a planar three-electrode MZM with a differential driver and a signal splitting circuit in a separate chip.

FIG. 6 illustrates an embodiment 600 of the apparatus 400 ("apparatus 600") where the MZM 310 is implemented in a photonic chip 610, and the drive circuit 430 with the differential driver 320 implemented in a second, RF IC, chip 620. In this embodiment, the drive circuit 430 includes four contact pads 621 provided in the second chip 620 for connecting the three drive electrodes 311, 313 of the MZM 310 to the outputs of the RF signal splitters 325, 326.

Figure 7:
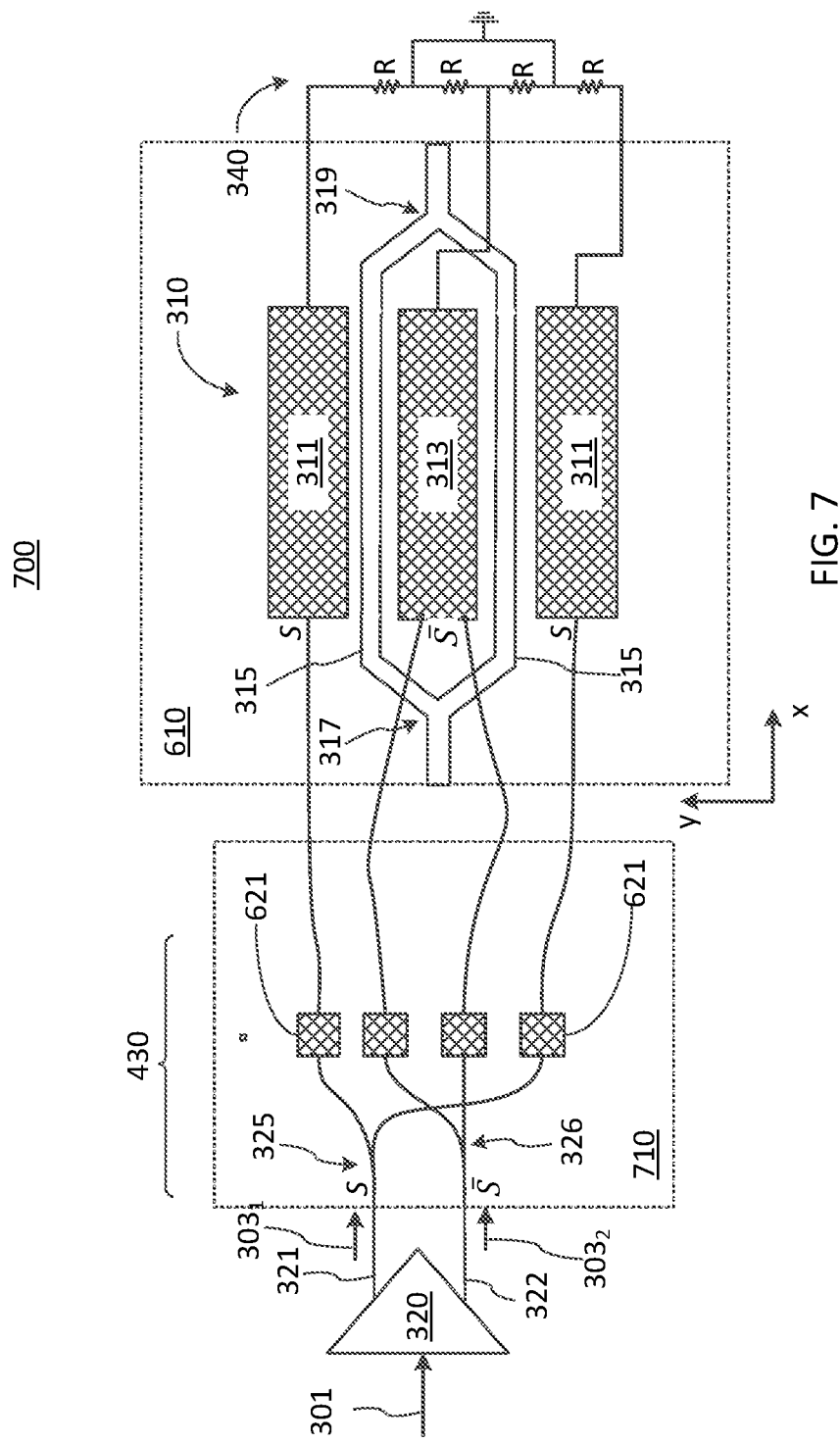
FIG. 7 is a schematic plan view of a planar three-electrode MZM with a signal splitting circuit in an interposer chip.

FIG. 7 illustrates an embodiment 700 of the apparatus 400 ("apparatus 700") where the MZM 310 is again implemented in the photonic chip 610, while the drive circuit 430 is implemented at least in part separately from both the photonic chip 610 and the differential driver 320, e.g., in an interposer 710. This implementation may allow using conventional differential driver ICs and conventional MZMs, e.g., configured for the GSG driving scheme, in embodiments of the present disclosure.

In the example embodiments illustrated in FIGS. 3-7, the drive electrodes 311, 313 are terminated with a load circuit 340 that connects the drive electrodes to ground with, e.g., a 50 Ohm resister network. Other embodiments may use different electrode termination schemes, depending on a particular design of a corresponding differential driver 320 or two parallel differential drivers 520A and 520B. For example, in some embodiments the load circuit 340 may include a DC voltage source, e.g., in embodiments with a so-called "open collector" biasing of the differential driver.

Referring back to FIG. 2, the differential $\overline{SSS}$ driving scheme described above with reference to the example embodiments may allow to approximately double the electric field 105 (FIG. 2) in an MZM with just a single electrode between the waveguide arms, compared to e.g., the single-ended GSG driving scheme of FIG. 1B with a same maximum voltage to an electrode. A further reduction in voltage requirements to the driver circuit may be achieved by reducing the distance between modulating electrodes, e.g., between one or both of the outer drive electrodes 120A/120B and the middle drive electrode 125, which would strengthen the horizontal component of the electric field 105 for a same voltage difference between the electrodes. However, in the planar MZM geometry of FIG. 2, placing the electrodes too close to the optical cores 118 of the modulator arms may result in a steep increase in optical losses in the modulator arms when tails of an optical mode in the waveguide arm start to overlap with the metal of the electrodes.

Figure 8:
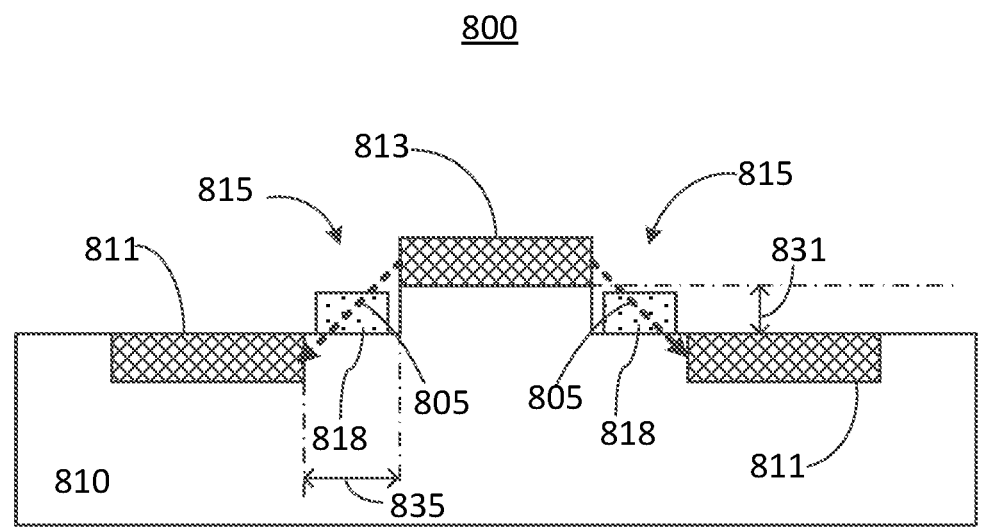
FIG. 8 is a schematic cross-sectional view of a planar MZM with vertically offset electrodes, e.g., for the MZM in any of FIGS. 3-7.

FIG. 8 schematically illustrates, in a vertical cross-sectional view of an example optical waveguide MZM 800 that may be used in embodiments of the present disclosure. The MZM 800 includes two outer drive electrodes 811, a middle drive electrode 813, and two optical waveguide arms 815 ("modulator arms 815") disposed along an approximately planar surface of substrate 810. The MZM 800 may be an embodiment of the MZM 310, the electrodes 811 and 813 may be embodiments of the drive electrodes 311 and 313 respectively, and optical waveguide arms 815 may be embodiments of the modulator arms 315. The substrate 810 may be any suitable planar substrate, e.g., a silicon substrate. The electrodes 811, 813 are vertically offset, with respect to the approximately planar surface, from optical waveguide cores 818 of the modulator arms 815 of the MZM in opposite directions (are "oppositely offset"). The optical waveguide cores 818 may include electro-optical material, such as but not exclusively LiNbO3. The vertical electrode offset may allow reducing the distance 835 ("electrode gap") between each of the outer electrodes 811 and the middle electrode 813 without substantially increasing the optical loss in the optical waveguide cores 818 of the modulator arms 815. In example embodiments, a vertical gap 831 between the electrodes 811, 813 may be e.g., from about one half of the thickness of optical cores 818 of the modulator arms 815 to about four times the thickness of the optical cores 818, or preferably between one and two times the thickness of the optical cores 818. In embodiments where the electrode gap 835 is suitably greater than the vertical gap 831, the presence of the vertical offsets 831, 832 may increase the strength of the horizontal component of the electrical field 805 in the optical waveguide cores 818, and therefor increase the efficiency of modulation of the refractive index of the optical waveguide cores 818 for a given peak-to-peak voltage applied between the middle and outer electrodes.

Figure 9:
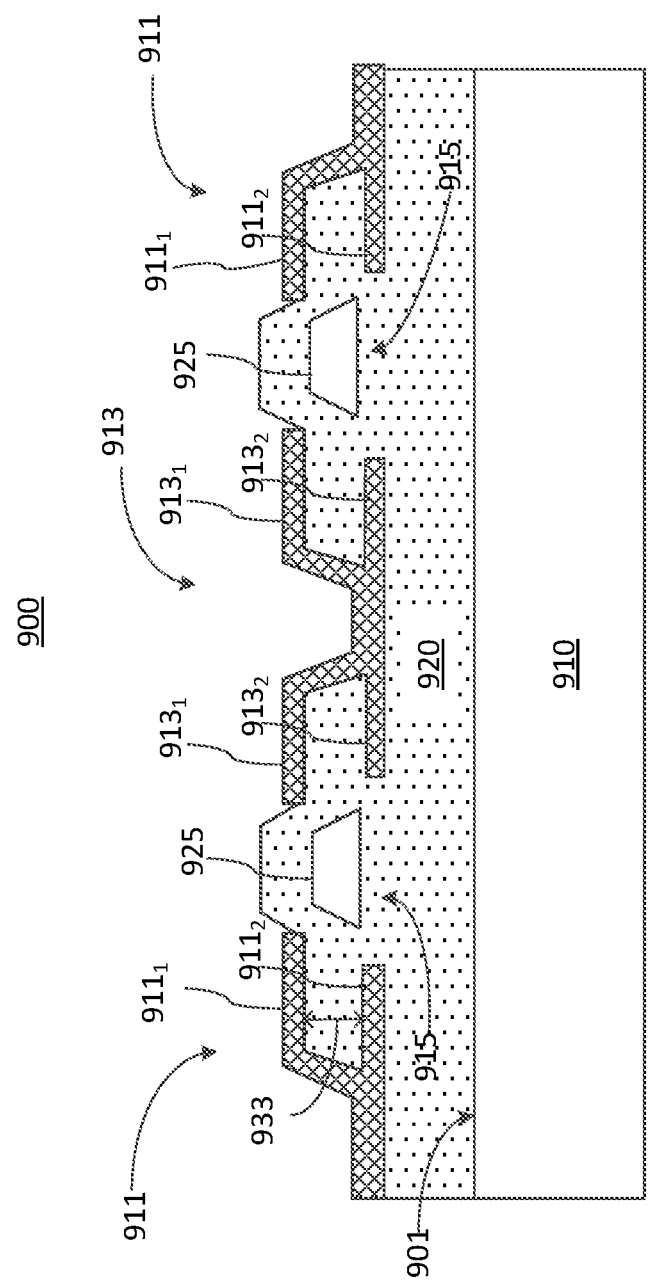
FIG. 9 is a schematic cross-sectional view of a planar MZM with vertically split electrodes, e.g., for the MZM in any of FIGS. 3-7.

FIG. 9 schematically illustrates a cross-section of another example optical waveguide MZM 900 that may be used in embodiments of the present disclosure. The MZM 900 is disposed along a main surface 901 of a planar substrate 910, e.g., a silicon substrate, and includes optical waveguide arms 915 aligned along the main surface 901 in the gaps between two outer electrode stacks 911 and a middle electrode stack 913. The optical waveguide cores 925 include suitable EO material, such as but not exclusively LiNbO3. The optical waveguide cores 925 are disposed in a dielectric layer 920 having a smaller refractive index that the material of the optical waveguide cores 925, e.g., a layer of silicon dioxide (SiO2). The electrode stacks 911 and 913 may embody the outer drive electrodes 311 and the middle drive electrode 313 of the MZM 310, respectively. Each of the electrode stacks 911 include two vertically stacked portions $911_1$ and $911_2$ that may be disposed with vertical offsets of opposite sign relative to the respective optical waveguide core 25. Similarly, the middle electrode stack 913 includes two vertically stacked portions $913_1$ and $913_2$, which are adjacent to respective ones of the two optical waveguide cores 925 and disposed with vertical offsets of opposite sign relative to the respective optical waveguide core 925. The vertically stacked portions of the outer and middle electrode stacks 911, 913 may be disposed fairly close to the optical waveguide cores 925 in the plane of the substrate 910 without causing excessive optical loss in the modulator arms. The split-electrode configuration of FIG. 9 may provide a greater electric field in the EO material of the optical waveguide cores 925 compared to single vertically-offset electrodes of FIG. 8 for a same voltage, thereby potentially increasing the modulation efficiency compared to the embodiment of FIG. 8.

Figure 10:
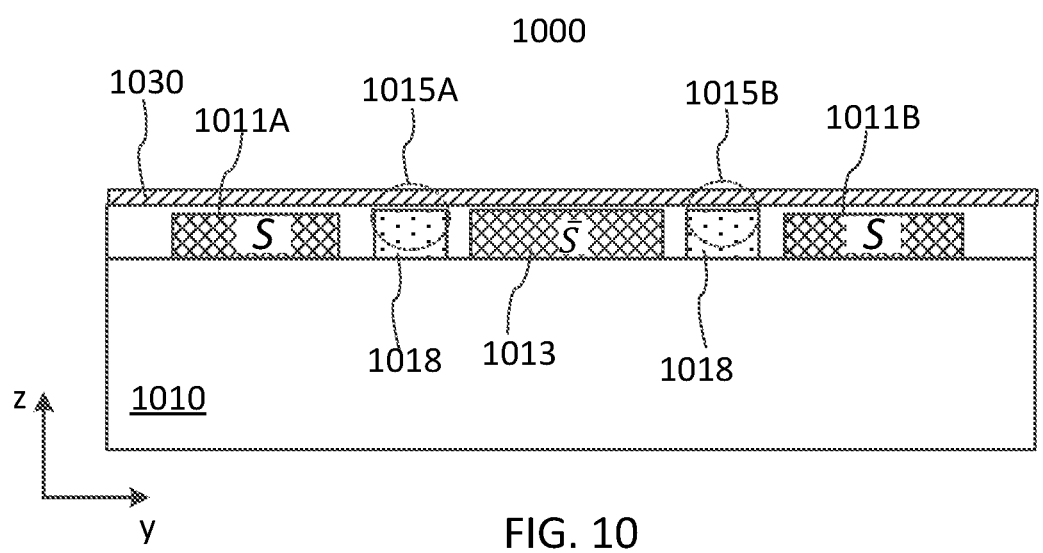
FIG. 10 is a schematic cross-sectional view of a planar MZM with a thin-film LN and hybrid optical cores of the modulator arms,, e.g., for the MZM in any of FIGS. 3-7.

FIG. 10 schematically illustrates a cross-section of another example optical waveguide MZM 1000 that may be used in embodiments of the present disclosure. The MZM 1000 may be an embodiment of the MZM of FIG. 2, in which modulator arms 1015A and 1015B have hybrid optical cores formed with a thin LN layer 930 disposed over waveguiding ridges 918. The modulator arms 1015A and 1015B are between two outer drive electrodes 1011, with a middle drive electrode 1013 being between the modulator arms 1015. The waveguiding ridges 1018 may be, for example, silicon ridges, and have a smaller refractive index that the refractive index of the lithium niobate layer 930, so that most of the energy of an optical mode propagating in the waveguide arms 1015A, 1015B are contained in the lithium niobate layer 1030 directly over the ridges 1018.

Herein, various embodiments of Mach-Zehnder optical modulators may have metallic drive electrodes as described in another U.S. patent application, titled "OPTICAL WAVEGUIDE MODULATOR", by Alessandro Aimone (Nokia docket no. NC328147-US-NP), which is being filed on the same day as the present U.S. patent application. This other U.S. patent application, which is mentioned in this paragraph, is incorporated herein, by reference, in its entirety.

According to an example embodiment disclosed above, e.g., in the summary section and/or in reference to any one or any combination of some or all of FIGS. 1A, 2-9, provided is an apparatus (e.g., 300, FIG. 3; 400, FIG. 4; 500, FIG. 5; 600, FIG. 6; 700, FIG. 7), comprising a planar electro-optic MZM (e.g., 100, FIG. 2; 310; FIGS. 3-7; 800, FIG. 8; 900, FIG. 9) disposed along a main surface (e.g., 103, FIG. 2) of a substrate (e.g., 110, FIG. 2, 810, FIG. 8; 910, FIG. 9), and an electrical drive circuit (e.g., 330, FIG. 3; 430, FIGS. 4, 6, and 76; 530, FIG. 5). The planar electro-optic MZM comprises: two optical waveguide arms (e.g., 115A, 115B, FIG. 2; 315, FIGS. 3-7; 815, FIG. 8; 915, FIG. 9) extending along the main surface and optically connected to receive light in parallel from an optical splitter (e.g., 317, FIGS. 3-7); three drive electrodes (e.g., 120A, 1120B, 125, FIGS. 2; 311 and 313, FIGS. 3-7; 811 and 813, FIGS. 8; 911 and 913, FIG. 9) extending along the optical waveguide arms to modulate light propagating therein, a middle one of the drive electrodes (e.g., 125, 313, 813, or 913) being between the two optical waveguide arms, the two optical waveguide arms being between the two outer ones of the drive electrodes (e.g., 120A and 120B; 311; 811; 911). The electrical drive circuit is connected to provide first modulation signals to the two outer ones of the drive electrodes and a second modulation signal to the middle one of the drive electrodes, wherein the AC component of the second modulation signal is voltage-inverted in sign relative to the AC component of the first modulation signals.

In some embodiments of the above apparatus, the MZM includes a layer of lithium niobate (e.g., 930, FIG. 9).

In some embodiments of any of the above apparatus, the electrical drive circuit is configured to modulate light in each of the optical waveguide arms via a radio-frequency (RF) voltage applied between the middle one of the drive electrodes and a corresponding one of the outer ones of the drive electrodes.

In some embodiments, any of the above apparatus may include a differential driver (e.g., 320, FIGS. 3, 4, 6, 7) having two differential output ports (e.g., 321, 322, FIGS. 3, 4, 6, 7), wherein the electrical drive circuit is configured to electrically couple a first of the two differential output ports (e.g., 321) to each of the two outer ones of the drive electrodes (e.g., 311), and to electrically couple the second of the two differential output ports (e.g., 322) to the middle one of the drive electrodes (e.g., 313).

In some embodiments of any of the above apparatus, the electrical drive circuit comprises a first electrical signal splitter (e.g., 325, FIGS. 3, 4, 6, 7) electrically coupling the first differential output port to the two outer drive electrodes. In some of such embodiments, the electrical drive circuit comprises a second electrical signal splitter (e.g., 326, FIGS. 4, 6, 7) in a signal path between the second differential output port and the middle one of the drive electrodes.

In some other embodiments of the above apparatus, the electrical drive circuit comprises two differential drivers (e.g., 320A and 320B) configured to operate in parallel to provide the first modulation signals (e.g., $503_1$ and $505_1$, FIG. 5) and the second modulation signal (e.g., $503_2$ and/or $505_2$, FIG. 5).

In some embodiments of any of the above apparatus, the planar electro-optic MZM and the electrical drive circuit are disposed on a same silicon photonic chip.

In some other embodiments of any of the above apparatus, the planar electro-optic MZM and at least a part of the electrical drive circuit are located in different chips (e.g., 620 and 610, FIGS. 6; 710 and 610, FIG. 7).

In some embodiments of any of the above apparatus, the two optical waveguide arms comprise Lithium Niobate (LiNbO3).

According to another example embodiment disclosed above, e.g., in the summary section and/or in reference to any one or any combination of some or all of FIGS. 1A, 2-9, provided is a method, comprising: applying first radio-frequency (RF) electrical drive signals (e.g., $303_{11}$, $303_{12}$, FIGS. 3, 4; $503_1$, $505_1$, FIG. 5) to two outer drive electrodes (e.g., 120A, 120B, FIG. 2; 311, FIGS. 3-7; 811, FIG. 8; 911, FIG. 9) of a planar electro-optic Mach-Zehnder modulator (e.g., 100, FIG. 2; 310, FIGS. 3-7; 800, FIG. 8; 900, FIG. 9); and applying a second RF electrical drive signal (e.g., $303_2$, FIGS. 3, 4, 6, 7; $503_2$ and/or $505_2$, FIG. 5) to a middle drive electrode of the planar electro-optic Mach-Zehnder modulator, the second RF electrical drive signal being voltage-inverted relative to the first RF electrical drive signals; wherein the middle drive electrode is between two optical waveguide arms of the planar electro-optic MZM and the two optical waveguide arms are between and along the outer drive electrodes.

In some embodiments of the above method, the applying first RF electrical drive signals comprises splitting a first single-ended component (e.g., $303_1$, FIG. 3) of a differential drive signal ($303_1$ and $303_2$, FIGS. 3, 4, 6, 7) to produce the first drive signals.

In some embodiments of any of the above methods, the acts of modulating vary a refractive index of a layer of lithium niobate (e.g., 830, FIG. 8; 318, 118, FIG. 2) at an RF frequency.

In some embodiments of any of the above methods, the steps of applying comprise operating two differential drivers (e.g., 320A and 320B, FIG. 5) in parallel to provide the first RF drive signals (e.g., $503_1$, $505_1$) and the second RF drive signal (e.g., $503_2$ and/or $505_2$).

The examples of electro-optical waveguide Mach-Zehnder modulators and driving schemes thereof described above are not intended to be limiting, and many variations will become apparent to a skilled reader having the benefit of the present disclosure. For example, in some embodiments the middle drive electrode (e.g., 125 in FIG. 2, 313 in FIGS. 3-7, 813 in FIG. 8, 913 in FIG. 9) may be divided length-wise into two centrally located electrodes extending along respective ones of the modulator arms, in operation said electrodes being driven in-phase (e.g., by respective ones of the drive signals $303_{21}$ and $303_{22}$, FIG. 4), each modulating the adjacent one of the modulator arms. Electrical connections between ports of the differential drivers and the drive electrodes may include DC and/or AC connections. In some embodiments, the drive electrodes may be capacitively loaded. In some embodiments, the optical cores (e.g., 118 in FIG. 2) may be "shallow" ridges formed in a layer of an EO material, such as e.g., LN. In some embodiment, the layer of the EO material may extend under the drive electrodes. Furthermore, one or more layers of other materials located over and/or under the optical cores and/or the drive electrodes may be present in various embodiments, including those providing optical cladding for the optical waveguides of the modulator arms.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims. Various features described above with reference to a specific embodiment or embodiments may be combined with other embodiments.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. e. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Furthermore, in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An apparatus comprising:
    a planar electro-optic Mach-Zehnder modulator (MZM) disposed along a surface of a substrate and comprising:
    two optical waveguide arms extending along the surface and optically connected to receive light in parallel from an optical splitter;
    three drive electrodes extending along the optical waveguide arms to modulate light propagating therein, a middle one of the three drive electrodes being between the two optical waveguide arms, the two optical waveguide arms being between two outer ones of the three drive electrodes; and
    an electrical drive circuit connected to provide first modulation signals to the two outer ones of the three drive electrodes and a second modulation signal to the middle one of the three drive electrodes, wherein the second modulation signal is voltage-inverted relative to the first modulation signals; and
    wherein the electrical drive circuit comprises an electrical signal splitter in a signal path of the second modulation signal to the middle one of the three drive electrodes.

2. The apparatus of claim 1, wherein the MZM includes a layer of lithium niobate.

3. The apparatus of claim 1, wherein the electrical drive circuit is configured to modulate light in each of the optical waveguide arms via a radio-frequency (RF) voltage applied between the middle one of the drive electrodes and a corresponding one of the outer ones of the drive electrodes.

4. The apparatus of claim 1, further comprising a differential driver having two differential output ports, wherein the electrical drive circuit is configured to electrically couple a first of the two differential output ports to each of the two outer ones of the drive electrodes, and to electrically couple the second of the two differential output ports to the middle one of the drive electrodes.

5. The apparatus of claim 4, wherein the electrical drive circuit comprises another electrical signal splitter electrically coupling the first differential output port to the two outer ones of the drive electrodes.

6. The apparatus of claim 4, wherein the electrical signal splitter is disposed in a signal path between the second of the two differential output ports and the middle one of the drive electrodes.

7. The apparatus of claim 1, wherein the planar electro-optic Mach-Zehnder modulator and at least a part of the electrical drive circuit are located in different chips.

8. The apparatus of claim 1, wherein the two optical waveguide arms comprise Lithium Niobate (LiNbO3).

9. A method comprising:
    applying first radio-frequency (RF) electrical drive signals to two outer drive electrodes of a planar electro-optic Mach-Zehnder modulator; and,
    applying a second RF electrical drive signal to a middle drive electrode of the planar electro-optic Mach-Zehnder modulator, the second RF electrical drive signal being voltage-inverted relative to the first RF electrical drive signals;
    wherein the middle drive electrode is between and along two optical waveguide arms of the planar electro-optic Mach-Zehnder modulator and the two optical waveguide arms are between and along the outer drive electrodes; and
    wherein the method further comprises splitting a first single-ended component of a differential drive signal to produce the first drive signals and splitting the second RF drive signal to direct the second RF drive signal to the middle drive electrode along two different paths.

10. An apparatus comprising:
    a planar electro-optic Mach-Zehnder modulator (MZM) disposed along a surface of a substrate and comprising:
    two optical waveguide arms extending along the surface and optically connected to receive light in parallel from an optical splitter;

three drive electrodes extending along the optical waveguide arms to modulate light propagating therein, a middle one of the three drive electrodes being between the two optical waveguide arms, the two optical waveguide arms being between two outer ones of the three drive electrodes; and an electrical drive circuit connected to provide first modulation signals to the two outer ones of the drive electrodes and a second modulation signal to the middle one of the drive electrodes, wherein the second modulation signal is voltage-inverted relative to the first modulation signals; and wherein the electrical drive circuit comprises a first electrical signal splitter for electrically coupling a first differential output port of a differential driver to the two outer ones of the drive electrodes, and a second electrical signal splitter in a signal path between a second differential output port of the differential driver and the middle one of the drive electrodes.

* * * * *